(12) United States Patent
Liu et al.

(10) Patent No.: US 8,695,093 B2
(45) Date of Patent: Apr. 8, 2014

(54) EXTERNAL LINK PROCESSING

(75) Inventors: Jiawei Liu, Hangzhou (CN); Jinhua Wang, Hangzhou (CN); Chenming Hua, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 13/476,810

(22) Filed: May 21, 2012

(65) Prior Publication Data

US 2012/0304292 A1    Nov. 29, 2012

(30) Foreign Application Priority Data

May 27, 2011  (CN) .......................... 2011 1 0140198

(51) Int. Cl.
*G06F 11/00* (2006.01)
*G06F 12/14* (2006.01)
*G06F 12/16* (2006.01)

(52) U.S. Cl.
USPC ................................ 726/22; 726/23; 707/782

(58) Field of Classification Search
None
See application file for complete search history.

(56) References Cited

U.S. PATENT DOCUMENTS

| 7,516,488 | B1 | 4/2009 | Kienzle et al. |
| 8,342,392 | B2 | 1/2013 | Kiliccote |
| 2002/0172367 | A1 | 11/2002 | Mulder et al. |
| 2007/0112774 | A1 | 5/2007 | Cheshire |
| 2007/0239528 | A1* | 10/2007 | Xie et al. ......................... 705/14 |
| 2009/0070873 | A1* | 3/2009 | McAfee et al. ................. 726/23 |
| 2010/0076890 | A1* | 3/2010 | Low et al. ........................ 705/44 |
| 2010/0268739 | A1* | 10/2010 | Zalepa ........................... 707/782 |
| 2010/0281254 | A1 | 11/2010 | Carro et al. |
| 2011/0289434 | A1* | 11/2011 | Kieft ............................... 715/760 |

FOREIGN PATENT DOCUMENTS

| EP | 1801745 | 6/2007 |
| WO | 2006136605 | 12/2006 |

* cited by examiner

*Primary Examiner* — Eleni Shiferaw
*Assistant Examiner* — Gregory M Elmore
(74) *Attorney, Agent, or Firm* — Van Pelt, Yi & James LLP

(57) ABSTRACT

A system and method of external link processing is disclosed. The system includes an interface configured to receive a user request to access an encoded external link in networked content. The encoded external link comprises a domain name of an external link server and an encoded portion which is an encoded result of an original external link encoded with an encoding function, wherein the original external link is an address to an external destination. One or more processors determine a safety level of the encoded external link using a criterion. In the event that the determined safety level of the encoded external link is determined unsafe, a warning message is generated indicating that the original external link is unsafe and the user is prevented from directly navigating to the original external link.

22 Claims, 4 Drawing Sheets

EXTERNAL LINK PROCESSING

CROSS REFERENCE TO OTHER APPLICATIONS

This application claims priority to People's Republic of China Patent Application No. 201110140198.X entitled A WEB LINK DETECTION METHOD, DEVICE AND SYSTEM filed May 27, 2011 which is incorporated herein by reference for all purposes.

FIELD OF THE INVENTION

This application involves the field of computer technology; in particular, it involves detection of web links.

BACKGROUND OF THE INVENTION

Networked content, like web pages, may come from various sources, including content entered by users. User entered content may contain various links. These links then can be accessed or navigated to by other users after the networked content is published. The user entered links could be internal or external links. External links have addresses that are outside of a particular domain name or domain names predefined as internal websites. Internal links are generally considered safe and reliable by default, while the safety of external links is difficult to guarantee.

In the existing technology, one method of detecting the safety of links is as follows: when the client sends an HTTP request to an application server, the application server detects whether the content of the current web page contains external links; if it contains external links, the application server processes the external links, for example, by filtering out the external links or converting them into plain text form. This detection method uniformly filters out all external links. While it is able to filter out unsafe external links, it simultaneously filters out safe external links. Such a detection method is often imprecise and can limit client browsing.

Another method of link detection in the existing technology is as follows: when the client sends an HTTP request to the application server, the application server detects whether the content of the current web page contains external links. If it contains external links, it compares the external links against unsafe links determined in a blacklist, and processes the external links that match the unsafe links contained in the blacklist, for example, by filtering out the unsafe external links.

In the existing detection methods, simple web link safety detection (such as domain name matching) is typically performed by the application servers, which are often unable to respond to situations when there is a high volume of web page accesses and safety verification logic is complex. Furthermore, manually maintained blacklists have long confirmation cycles and slow response speeds.

BRIEF DESCRIPTION OF THE DRAWINGS

Various embodiments of the invention are disclosed in the following detailed description and the accompanying drawings.

DETAILED DESCRIPTION

Figure 1:
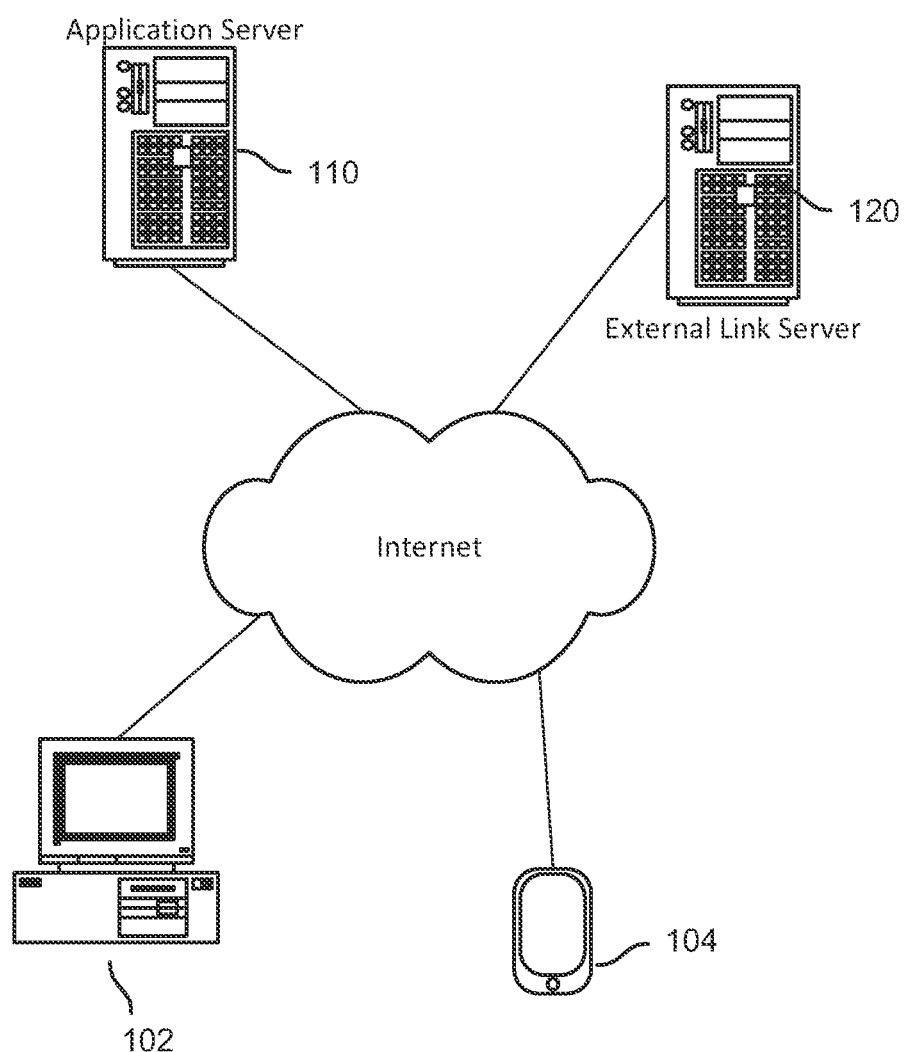
FIG. 1 is an illustration of an embodiment of a system and environment for external link processing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

External link processing of user entered content is disclosed. In some embodiments, external links that have been entered by a user are encoded to point to an external link server (e.g., a trusted server) and are processed by the external link server. In some embodiments, the encoded external link comprises the domain name of the external link server and an encoded portion comprising the result of encoding the original external link with an encoding function. In some embodiments, the external link server decodes the external link to obtain the original external link and processes the external link by checking the safety level of the external link. In some embodiments, the external link server checks the external link against a criterion to determine the safety level of the external link. If the external link is determined unsafe, a warning message is sent to the user and the user is prevented from directly navigating to the external link. If the external link is determined to be safe, the user is redirected to the external link.

In some embodiments, the criterion comprises a whitelist of trusted sites and the safety level is determined by checking the external link against a whitelist. In some embodiments, the criterion comprises a blacklist of untrusted sites and the safety level is determined by checking the external link against a blacklist. In some embodiments, both the whitelist and the blacklist are checked to determine the safety level of the external link.

In some embodiments, the safety checking criteria is updated. In some embodiments, the result of the safety check of an external link is logged. In some embodiments, the safety check log comprises the external links and the determined safety level. In some embodiments, the safety check log is analyzed. In some embodiments, the criterion is updated according to the analysis of the safety check log. In some embodiments, the criterion is updated based on website safety information obtained from a third party including an internet safety agency or a user report.

FIG. 1 is an illustration of an embodiment of a system and environment for external link processing. Users connect to application server 110 through the internet using internet enabled device 104 (e.g., a tablet, a smartphone). A content-viewing user using computer 102 communicates through the internet to application server 110 to access a webpage. In some embodiments, a content-creating user enters content, including links to be stored on application server 110. In some embodiments, the links entered by the content-creating user may comprise an external link. For example, a content-creating user can be a seller on an e-commerce website, who enters a description of an item the seller is selling, including a link to a manufacturer's website which describes in more detail the item's features. The seller entered description also includes a link to a picture that is hosted on the e-commerce website. In some embodiments, an external link comprises a link to resources external to the application server. In some embodiments, external links are links that have a different domain name than the application server. In some embodiments, external links are links to websites that are not within the same family of websites as the owner of the application server (and therefore not subject to the same administrative control). In some embodiments, external links are links to web pages or websites that are not from trusted sources. Trusted sources are websites or hosts that follow an agreed upon safety protocol, or have policies in place that protect user information and appropriately handle user information. Other standards for trusted hosts, websites, or content can be used to establish a level of trust between the originating website and an external resource, host, or website.

After the content is entered by a content-creating user, a content-viewing user can view the content in a web browser on computer 102 or internet enabled device 104. The user entered content may include an external link. However, the external link that the user now sees on the webpage is an encoded external link. After receiving the user entered content, application server 110 encodes the external links. In some embodiments, to any user viewing the content, the encoded external link looks the same as the original link but the target or address of the URL has been encoded (e.g., the text of the link is the same, but the URL points to a different address). In some embodiments, the target address of the encoded external link is encoded to include a domain of an external link server and an encoded portion comprising the result of encoding the external link encoded with an encoding function.

A user wanting to navigate to the external link the user sees on the webpage can select the encoded external link. The request for the encoded link goes to external link server 120 to be processed for a safety determination. External link server 120 is provided to facilitate the processing of external links. External link server 120 determines the safety of the external links and returns a safety level of the external link. In some embodiments, if external link server 120 determines that the safety level of the external link is safe, then the external link server will automatically redirect the user to the target of the external link. In some embodiments, if external link server 120 determines the safety level of the external link to be unsafe, the external link server will send a warning message about the safety level of the external link. In some embodiments, if the external link is neither safe nor unsafe, the safety level is determined unknown, and the external link server will send a warning message and include a hyperlink to the external link.

External link server 120 provides safety checking of external links. Application server 110 provides webpages and services, and encodes external links. Application server 110 and external link server 120 could also be web servers. In some embodiments, external link server 120 and application server 110 are different servers operating on different devices in the same network, cloud, host, or on different networks. In some embodiments, external link server 120 and application server 110 operate on the same device, as different processes, threads, or services.

In some embodiments, external link server receives user requests to access encoded external links from links in several different types of networked content that are provided by application servers (e.g., application server 110) or web servers. In some embodiments, the application server delivers an instant messaging (IM) service and encodes external links entered by a sending user, and the external link server receives an external link safety check request through an encoded external link displayed on an IM client. In some embodiments, the IM client on the sending or receiving user's device encodes the external link and the encoded external link directs to the external link server for safety checking For example, a sending user communicating to another user through an instant messaging service provided by an application server sends an IM with a link that is an external link. The application server is configured to encode the link if it is an external link, and send the IM with the encoded link to the receiving user. The receiving user clicks on the encoded external link and the request is directed to the external link server, which performs a safety check on the external link and returns a result. The external link server, depending on the result of the safety check, will redirect the receiving user to the external link or will send a warning message to the receiving user.

Figure 2:
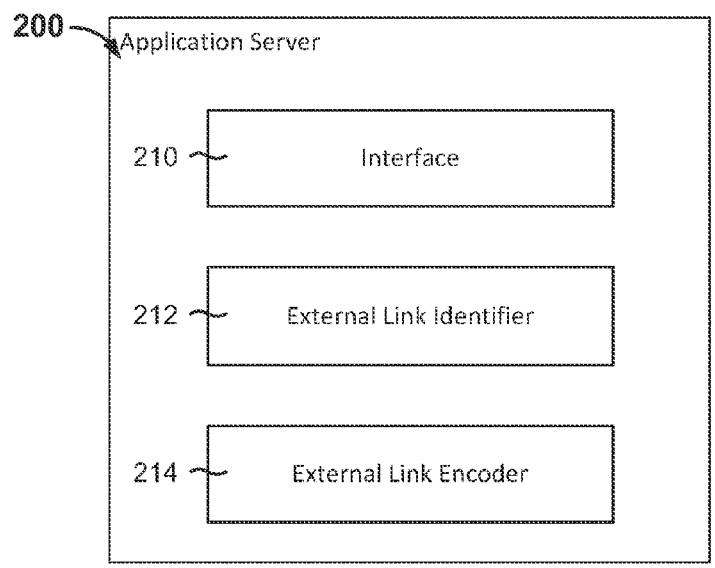
FIG. 2 is a block diagram illustrating an embodiment of an application server that converts external links into encoded external links.

FIG. 2 is a block diagram illustrating an embodiment of an application server that converts external links into encoded external links. Application server 200 comprises at least interface 210, one or more processors, and a memory. In some embodiments, application server 200 further comprises external link identifier 212 and external link encoder 214. In some embodiments, interface 210 receives content entered by a user that may include external links. In some embodiments, external link identifier 212 identifies links that are external from the user entered content. In some embodiments, external link encoder 214 encodes identified external links and converts the original external link into an encoded external link.

Figure 3:
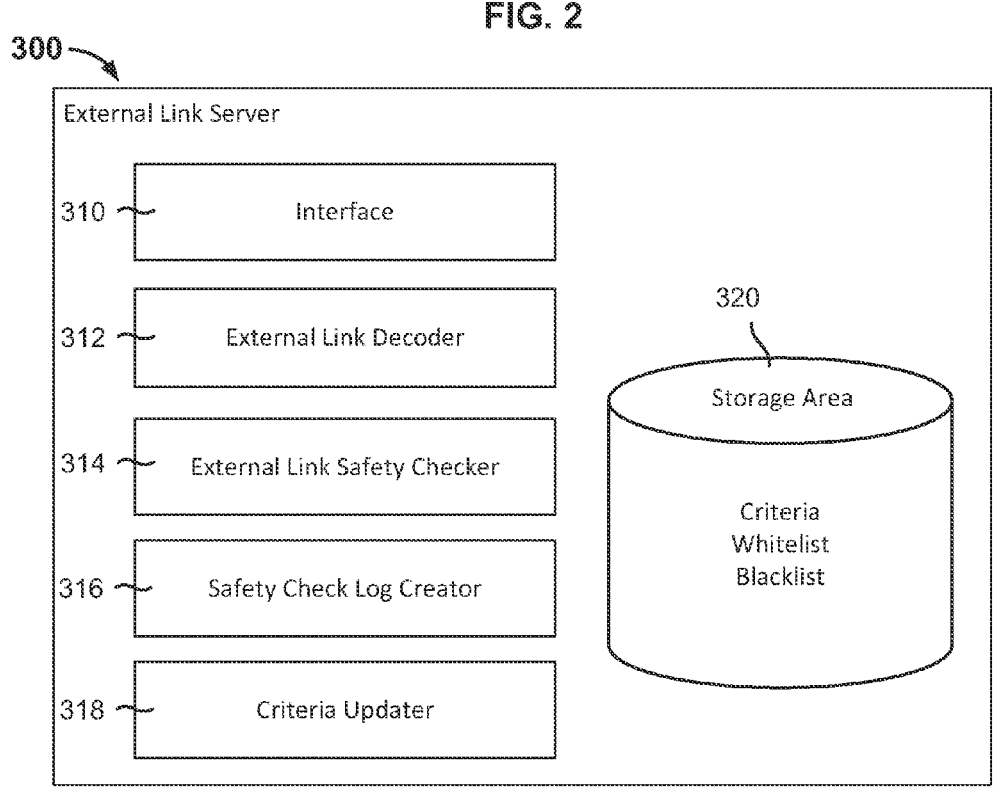
FIG. 3 is a block diagram illustrating an embodiment of an external link server that processes external links.

FIG. 3 is a block diagram illustrating an embodiment of an external link server that processes external links. External link server 300 comprises at least an interface 310, storage area 320, and one or more processors. In some embodiments, external link server 300 further comprises external link decoder 312, external link safety checker 314, safety check log creator 316, and criteria updater 318. In some embodiments, interface 310 receives a user request to access an encoded external link. In some embodiments, external link decoder 312 decodes the encoded external link to obtain the original external link. In some embodiments, external link safety checker 314 runs a safety check on the external link to determine a safety level. In some embodiments, external link safety checker 314 also returns the result of the safety check. In some embodiments, safety check log creator 316 creates a log of the activity of the external link safety checker 314. In some embodiments, criteria updater 318 updates the criterion used in determining the safety level. In some embodiments, storage area 320 comprises one or more of the following: a criterion, a whitelist, a blacklist, or a safety check log. In some embodiments, the criteria, whitelist, blacklist, and safety check log are stored in another storage area in communication with the external link server (e.g., in a database, remote storage, etc.).

The system described in FIGS. 1, 2, and 3 may be implemented using one or more computing devices such as a personal computer, a server computer, a handheld or portable device, a flat panel device, a multi-processor system, a microprocessor-based system, a set-top box, a programmable consumer electronic device, a network PC, a minicomputer, a large-scale computer, a special purpose device, a distributed computing environment including any of the foregoing systems or devices, or any other hardware/software/firmware combination that includes one or more processors, and memory coupled to the processors and configured to provide the processors with instructions.

The units or components described above can be implemented as software components executing on one or more general purpose processors, as hardware such as programmable logic devices and/or Application Specific Integrated Circuits designed to perform certain functions, or a combination thereof. In some embodiments, the units or components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units or components may be implemented on a single device or distributed across multiple devices. The functions of the units or components may be merged into one another or further split into multiple sub-units.

Figure 4:
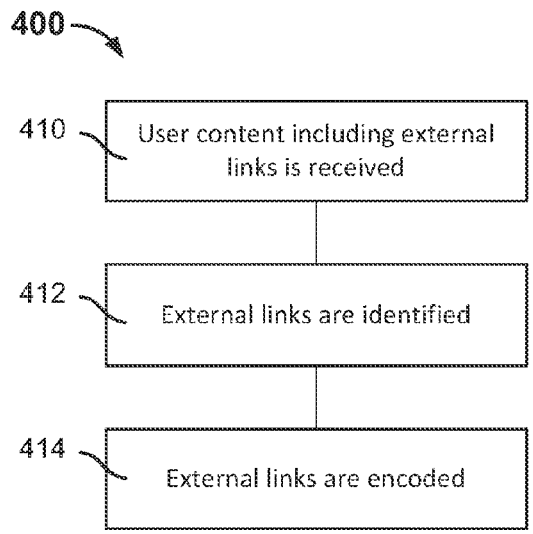
FIG. 4 is a flow chart illustrating a method of converting the external links to encoded external links.

FIG. 4 is a flow chart illustrating a method of converting the external links to encoded external links. Process 400 can be performed by application server 110 of FIG. 1 or application server 200 of FIG. 2. At 410, user entered content is received. A user enters content that may include links, external links, or internal links. In some embodiments, the user entered content is then stored. In some embodiments, the user entered content is stored on the application server that serves the user entered content. In some embodiments, the user entered content is stored in a local or remote storage area (e.g., a database, storage device) in communication with the application server. In some embodiments, the application server is an IM server and the user entered content is stored and sent to the receiving user client.

At 412, external links are identified. In some embodiments, the user entered content is scanned and all links are extracted. In some embodiments, the user entered content is parsed and all links are extracted. In some embodiments, links are extracted using the "href" attribute in the HTML (HyperText Markup Language) tag. In some embodiments, links are extracted using the "<a>" HTML tag, wherein the hyper link HTML tag (i.e., <a> HTML tag) contains other values and attributes that designate the address or target of the link. In some embodiments, links are extracted by the string "http://" or "www" in the user entered content. Other ways of identifying links can be employed as known to those ordinarily skilled in the art.

In some embodiments, the extracted links are determined to be external or not external. The extracted link contains a target address of the link, and based on the target address of the link, the extracted link is classified as external or not. In some embodiments, the extracted link is determined to be an external link that comprises a link to resources external to the application server. In some embodiments, external links are links that have a different domain name than the application server. For example, all extracted links from the user entered content that do not have a domain name of "www.alibaba.com" are considered external. In some embodiments, the external links are links to websites that are not within the same family of websites as the owner of the application server. For example, if the owner of the website and the application server operates the domain http://www.alibaba.com.cn, and also has control over another website http://www.taobao.com.cn, then both websites are within the same family and are considered internal, while links to other domains are considered external. In some embodiments, the external links are links to webpages or websites that are not from a list of trusted sources.

At 414, the external links are encoded. The links from the user entered content that have been identified as external (also called original external link, to indicate a pre-encoded state) are encoded using an encoding function. The encoding function serves to change the original external link into a string of characters that are not easily recognizable by a user to hide the original external link. The encoded external link is then appended to the domain name of the external link server (i.e., external link server 120 of FIG. 1 or external link server 300 of FIG. 3). Therefore, the external link is now routed to the external link server so the external link server can do processing of the external link. In some embodiments, the encoded external link is added as a parameter in a link that points to the external link processing server.

In some embodiments, the encoding function is a Base62 encoding function. A Base62 encoding function takes an input of strings or values and returns the input converted to another base. The output of the Base62 encoding function is different than the input and is unique for each input. In some embodiments, at least a portion of the external link is encoded with a Base62 encoding function. For example, if the original external link is "http://www.example.com/home.html" and is inputted to the Base62 encoding function, the output is "d3d3LmV4YW1wbGUuY29tL2hvbWUuaHRtbA==," which is appended to the domain name of the external link server. For example, if the domain name of the external link server is extlinksvr35.alibaba.com, then the resulting encoded external link is http://extlinksvr35.alibaba.com/d3d3LmV4YW1wbGUuY29tL2hvbWUuaHRtbA==. Therefore, when an http request for the target of the external link is sent over the network, it resolves at the external link server. In some embodiments, the encoded external link is formed with a target to the external link server and the encoded portion of the external link added as a parameter (e.g. in a URL query string). Using the same example external link, the encoded external link would be: http://extlinksvr35.alibaba.com/check.cgi?url=d3d3Lm V4YW1wb GUuY29tL2hvbWUuaHRtbA==. Other encoding functions can also be used to encode the original external link into an unrecognizable string. In some embodiments, a Base64 encoding function is used.

In some embodiments, the external links are identified and encoded only when a user requests to view the user entered content. For example, the user entered content including external links is stored on the application server as originally entered by the user. When the user or another user requests to view the page including the external link, the application server identifies and encodes the external links in the generation of the website for the page view. In some embodiments, the application server identifies and encodes external links each time the page is generated and viewed. In some embodiments, the application server identifies and encodes the external links once and stores the external links as encoded external links for all subsequent page views. In some embodiments, the external links are converted to encoded external links right after the user enters the user content, and stores user entered content including the external links as encoded external links.

A user viewing the user entered content will see the external links, but the external links are now replaced with encoded external links. In some embodiments, the user is viewing the external link in a web page and the encoded external link looks the same to the user viewing the user entered content. For example, a seller on a marketplace website enters a link with the label "View technical specs," for an electronics item being sold. The link also includes a target address or destination address to an external webpage, like a manufacturer's webpage with technical specs of the electronics item. A buyer viewing the item description on the marketplace website will see a link saying "View technical specs" but the target of the external link is replaced with the encoded external link and will link to the external link server for a safety check. Similarly, in an IM application, a sending user enters an external link to be sent to the receiving user, but the receiving user sees the link, which is an encoded link. For example, a sending user sends an instant message with a link to an online photo album, with the text "look at my photo album" and with a destination address: http://www.photos.com/myphotoalbum. The application server or the IM client encodes the external link and sends the IM message with the external link still saying "look at my photo album" but with a target address replaced with an encoded external link (e.g., http://extlinksvr35.alibaba.com/d3d3LnBob3Rycy5jb20vbX1waG90b2FsYnVt). In some embodiments, the encoded external link looks different to the user viewing the user entered content. For example, the external link entered by the user, http://www.photos.com/myphotoalbum, is replaced with http://extlinksyr35.alibaba.com/d3d3LnBob3Rvcy5jb20vbX1waG90b2FsYnVt and the viewing user sees the encoded link instead.

Figure 5:
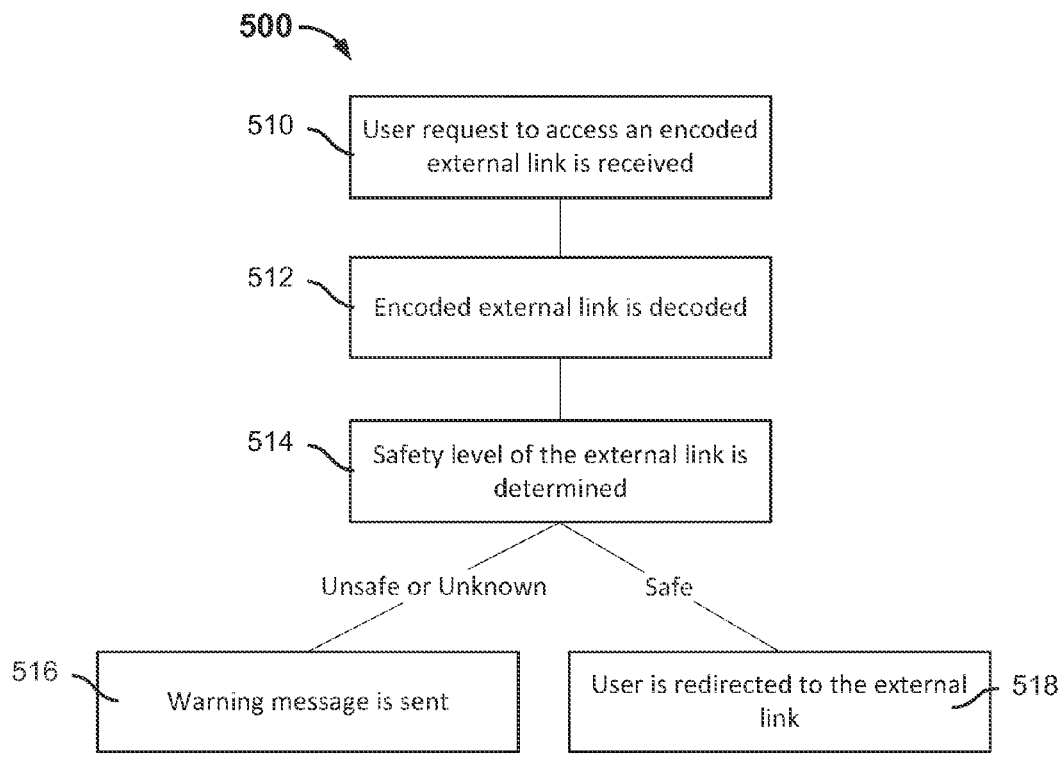
FIG. 5 is a flowchart illustrating the method of processing external links according to safety level.

FIG. 5 is a flowchart illustrating the method of processing external links according to safety level. Process 500 can be performed by external link server 120 of FIG. 1 or external link server 300 of FIG. 3. At 510, a user request to access an external link is received. The user viewing a webpage can be shown several external links. For example, a webpage showing an item description may contain an external link to technical specs on a manufacturer's website, or a button that links to a 3$^{rd}$ party web service that provides a rating of the item, or to the seller's own online store front. In some embodiments, one or more external links are encoded. A user can choose to click on an encoded external link and a request is sent to the external link server for processing. Similarly, for example in an IM client, the receiving user sees an external link and can choose to click on the external link that has been encoded. In some embodiments, the click on the encoded external link opens a new window in the browser window which is waiting for the external link server to fulfill the http request. At 512, the request containing the encoded external link is decoded using the same encoding function. For example if the application server encoded the original external link with Base62 encoding, the external link server decodes the encoded portion of the encoded external link to obtain the original external link. The external link decoder knows the encoding function that was used to encode the external link.

At 514, a safety level of the external link is determined. The safety level is determined by comparing the external link to a criterion. The criterion comprises a whitelist, a blacklist, or both. In some embodiments, the original external link is compared to the criterion. In some embodiments, the encoded external link can also be compared to the criterion.

In some embodiments, the criterion comprises a blacklist. The blacklist comprises websites or external resources that the originating website (or the owner of the application server or the owner of the originating website) considers untrustworthy. For example, a blacklist contains websites that are known to be phishing websites, websites that attack user computers and clients, websites that disseminate worms and viruses, or websites that misuse user information. A blacklist can also contain websites that do not meet an internet safety standard. Other external resources can also be blacklisted, like web services, web applications, or certain scripts using the URL address of the external resource or a portion of the URL address.

In some embodiments, the criterion comprises a whitelist. The whitelist comprises a list of trusted sites. In some embodiments, trusted websites are sites that have agreed upon safety protocols or safety standards. In some embodiments, the whitelist includes websites that are also considered to be internal websites (e.g., websites considered in the same family of websites as the application server). In some embodiments, the whitelist comprises trustworthy external websites, which are in addition to internal websites (which are considered trustworthy). In some embodiments, the whitelist comprises all trustworthy websites or websites that have already been determined to be trustworthy. The external link server, which provides a safety checking service, does not need to know the difference between external and internal websites, but executes a safety check on all links directed to the external link server. Internal websites can be assumed to be filtered out by the application server choosing which links to encode (and direct to the external link server).

The lists, either the whitelist or blacklist, contain general addresses (e.g., domain names) or specific addresses (e.g., URL's or ip addresses), or any appropriate way of identifying websites, web hosts, web pages, web services, web applications, and various other networked content.

Using the criteria, a safety level is determined. A safety level comprises safe, unsafe, or unknown. In some embodiments, the external link is compared to a blacklist. If the external link is found on the blacklist, the external link is considered unsafe. At 516, if the external link is determined unsafe, a warning message is generated and sent to the user. In some embodiments, the warning message sent to the user includes a message that the external link is unsafe. For example, after the user clicks on the external link on the item description on the marketplace website, a new window opens, and the external link server returns a page displaying the warning message "the link you clicked is unsafe," preventing the user from directly navigating to a website that is on the blacklist. In some embodiments, the warning message is a message without outputting the original external link, therefore additionally preventing the user from knowing the original destination of the external link. In some embodiments, the warning message sent to the user comprises a warning message that the link is unsafe and also containing the external link (i.e., the original external link) converted to plain text form. Transforming the unsafe hyperlink into plain text prevents the user from directly navigating to the unsafe external link (in other words, the user cannot access the unsafe external link by simply clicking on it). If the user should like to still navigate to the external link, the user can manually copy and paste the plain text link into a web browser address bar. In some embodiments, if the external link is determined unsafe, no warning message is sent and the user is prevented from navigating to the unsafe external link. For example, if the user clicks on the external link, and another window pops-up but after the external link server determines the external link is unsafe, nothing is returned to the pop-up window. The unsafe external link behaves like a broken link. The user is prevented from learning about the address of the original unsafe external link because the source of the webpage or even the URL in the address bar of the pop-up window is the encoded external link.

In some embodiments, the external link is compared to a whitelist. If the external link is found on the whitelist, the external link is considered to be safe. At 518, if the external link is determined safe, the user is redirected to the external link (i.e., the target of the original external link).

In some embodiments, the external link is only checked against the whitelist. Then any external link that is not on the whitelist is considered unsafe. In some embodiments, the external link is only checked against the blacklist, and any external links not on the blacklist are considered safe. In some embodiments, the external link is checked against the whitelist and the blacklist. If the external link is not on the whitelist or the blacklist, the safety level of the external link is determined to be unknown. At 516, if the external link is determined to be unknown, a warning message is sent to the user. In some embodiments, the warning message includes a message about the safety determination of the link and a hyperlink to the external link (i.e., the original external link). In some embodiments, the warning message contains language explaining that the unknown external link may be risky. So a user is informed of the risk they would undertake by navigating to the external link determined to be of unknown safety. In some embodiments, the external link is checked against the whitelist before the blacklist, and the user can navigate to safe external links faster.

The whitelist or blacklist contains general addresses (e.g., domain names) or specific addresses (e.g., URL's or IP addresses). In some embodiments, comparing the external link against the blacklist or the whitelist comprises matching a portion of a specific address on the list. In some embodiments, when comparing the external link against a list to determine a safety level, matching rules are used to match only the domain of the address on the list. In some embodiments, matching rules are used to match the external link against general addresses (e.g., domain names) on a list. In some embodiments, after matching against the general list, the external links are compared to the specific addresses. Other matching rules designating a search pattern or matching pattern in lists can also be used.

Figure 6:
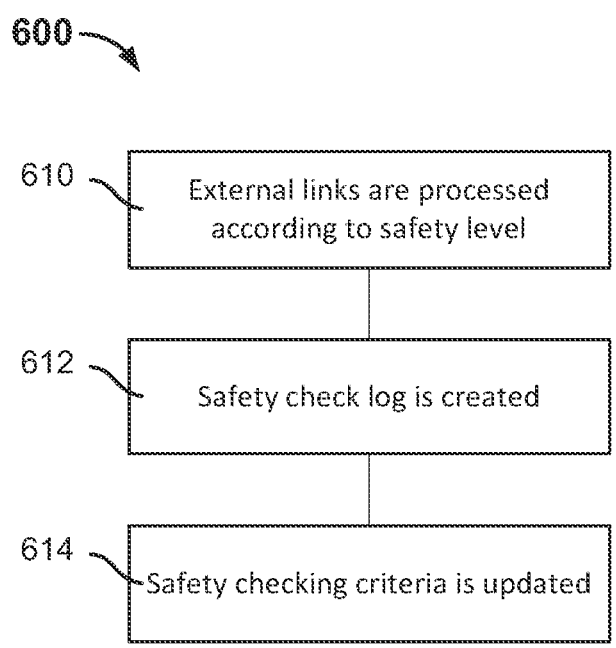
FIG. 6 is a flowchart illustrating the method of maintaining a safety checking criterion.

FIG. 6 is a flowchart illustrating the method of maintaining a safety checking criterion. Process 600 can be performed by external link server 120 of FIG. 1 or external link server 300 of FIG. 3. At 610, external links are processed according to the safety level as in the method described in FIG. 5. At 612, a safety check log is created from the results of the external link processing and is stored. In some embodiments, the safety check log comprises the external link that has been processed (e.g., the original external link or the encoded external link) and the result of the determination of the safety level. For example, the safety check log includes the original external link "http://www.example.com/home.html" and that the external link was determined safe. In some embodiments, the safety check log also includes what list matched or did not match to the external link. The safety check log can also include a time stamp, an index, an identifier, or any other relevant information.

At 614, safety checking criteria is updated. In some embodiments, the safety checking criteria, comprising the whitelist, the blacklist, or another type of criteria, is updated. In some embodiments, the safety checking criteria is updated at fixed intervals. In some embodiments, the safety checking criteria is updated according to analysis done on the safety check log. In some embodiments, the external link server analyzes the safety check log and updates the whitelist or blacklist or both accordingly. In some embodiments, the safety check log is deduplicated. In other words, instead of recording the same external links multiple times, the external link is recorded once according to the most recent analysis. In some embodiments, a count of the number of times the external link has been processed is kept. In some embodiments, deduplication is done at the time of determination and recoding of the log. In some embodiments, deduplication is done at the time of analysis of the safety check log. In some embodiments, the external link server updates the blacklist and the whitelist by adding or removing addresses from the lists. In some embodiments, the external link server updates the matching rules for matching external links to the blacklist or the whitelist.

In some embodiments, the safety checking criteria is updated using safety information obtained from a third party. For example, a virus database is downloaded at fixed intervals and the blacklist or whitelist is updated. In some embodiments, the third party provides updated whitelists and blacklists. In some embodiments, the whitelist or blacklist is updated according to internet safety information obtained from an internet safety agency. In some embodiments, the whitelist or blacklist is updated according to user reports of external links the user found to be unsafe or safe. Therefore, at regular intervals, websites or external resources that were once determined to be unsafe (i.e., on the blacklist) can gain good standing again and be placed on the whitelist, and vice versa.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for external link processing comprising:
an interface configured to:
  receive a user request to access an encoded external link in networked content, the encoded external link comprising:
    a domain name of an external link server; and
    an encoded portion comprising an encoded result of an original external link encoded with an encoding function, wherein the original external link is an address to an external destination, wherein the original external link is replaced on a web page by the encoded external link to be selected by a user, and wherein the external link server is external to a server hosting the web page, and external to the external destination;
one or more processors coupled to the interface, configured to:

decode the encoded external portion into the original external link based on the same encoding function that was used to encode the original external link into the encoded portion;

determine a safety level of the encoded external link using a criterion; and in the event the determined safety level of the encoded external link is determined unsafe, generate a warning message that the original external link is unsafe and prevent the user from directly navigating to the original external link; and one or more memories coupled with the one or more processors, configured to provide the one or more processors with instructions.

2. The system of claim 1, wherein the generating of the warning message includes generating the warning message without including the original external link.

3. The system of claim 1, wherein the generating of the warning message includes converting the original external link to plain text.

4. The system of claim 1, wherein in the event that the determined safety level of the encoded external link is safe, redirecting the user to the destination of the original external link.

5. The system of claim 1, wherein in the event that the determined safety level of the encoded external link is unknown, the generating of the warning message comprises generating a message that the safety level of the external link is unknown, and outputting a link comprising the original external link.

6. The system of claim 1, wherein in the event that the determined safety level of the encoded external link is unknown, the generating of the warning message comprises generating a message that the safety level of the external link is unknown, and converting the original external link to plain text.

7. The system of claim 1, wherein the one or more processors are further configured to decode the encoded external link to receive the original external link.

8. The system of claim 1, wherein the determining of the safety level of the encoded external link using the criterion comprises checking the original external link against a blacklist.

9. The system of claim 8, in the event the original external link is on the blacklist, the determined safety level is unsafe.

10. The system of claim 1, wherein the determining of the safety level of the encoded external link using the criterion comprises checking the original external link against a whitelist.

11. The system of claim 10, in the event the original external link is on the whitelist, the safety level is safe.

12. The system of claim 1, wherein the determining of the safety level of the encoded external link using the criterion comprises checking the original external link against a whitelist and a blacklist.

13. The system of claim 12, in the event the original external link is not on the whitelist or the blacklist, the safety level is unknown.

14. The system of claim 1, wherein the one or more processors are further configured to create a safety check log comprising the determined safety level of the encoded external link and the original external link.

15. The system of claim 14, wherein the safety check log is deduplicated.

16. The system of claim 14, wherein the one or more processors are further configured to analyze the safety check log at fixed intervals.

17. The system of claim 14, wherein the one or more processors are further configured to update the criterion based on an analysis of the safety check log.

18. The system of claim 1, wherein the one or more processors are further configured to update the criterion based on safety information from a third party.

19. A method of processing external links comprising:

receiving a user request to access an encoded external link in networked content, the encoded external link comprising:

a domain name of an external link server; and an encoded portion comprising an encoded result of an original external link encoded with an encoding function, wherein the original external link is an address to an external destination, wherein the original external link is replaced on a web page by the encoded external link to be selected by a user, and wherein the external link server is external to a server hosting the web page, and external to the external destination;

decoding the encoded external portion into the original external link based on the same encoding function that was used to encode the original external link into the encoded portion;

determining a safety level of the encoded external link using a criterion; and in the event the determined safety level of the encoded external link is determined unsafe, generating a warning message that the original external link is unsafe and preventing the user from directly navigating to the original external link.

20. A computer program product for processing external links, the computer program product being embodied in a tangible non-transitory computer readable storage medium and comprising computer instructions for:

receiving a user request to access an encoded external link in networked content, the encoded external link comprising:

a domain name of an external link server; and an encoded portion comprising an encoded result of an original external link encoded with an encoding function, wherein the original external link is an address to an external destination, wherein the original external link is replaced on a web page by the encoded external link to be selected by a user, and wherein the external link server is external to a server hosting the web page, and external to the external destination;

decoding the encoded external portion into the original external link based on the same encoding function that was used to encode the original external link into the encoded portion;

determining a safety level of the encoded external link using a criterion; and in the event the determined safety level of the encoded external link is determined unsafe, generating a warning message that the original external link is unsafe and preventing the user from directly navigating to the original external link.

21. The system of claim 1, wherein the determining of the safety level of the encoded external link using the criterion comprises:

compare the decoded original external link against a whitelist comprising a plurality of safe links; and in the event that the decoded original external link matches one of the safe links in the whitelist, determine the safety level of the original external link as safe.

22. The system of claim 1, wherein the encoding function is a Base62 encoding function or a Base64 encoding function.

* * * * *

UNITED STATES PATENT AND TRADEMARK OFFICE
CERTIFICATE OF CORRECTION

PATENT NO. : 8,695,093 B2  
APPLICATION NO. : 13/476810  
DATED : April 8, 2014  
INVENTOR(S) : Jiawel Liu Page 1 of 1

It is certified that error appears in the above-identified patent and that said Letters Patent is hereby corrected as shown below:

In the Claims

In column 11, line 1, claim 1, delete "portion" and insert -- link --
In column 12, line 18, claim 19, delete "portion" and insert -- link --
In column 12, line 45, claim 20, delete "portion" and insert -- link --

Signed and Sealed this
Third Day of March, 2015

Michelle K. Lee
*Deputy Director of the United States Patent and Trademark Office*